(No Model.) 2 Sheets—Sheet 2.
M. B. GIBSON.
BICYCLE.
No. 464,357. Patented Dec. 1, 1891.
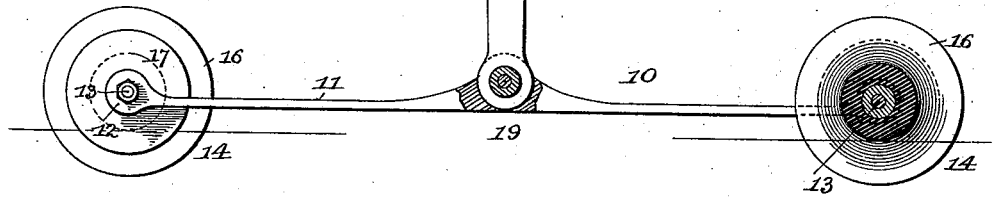
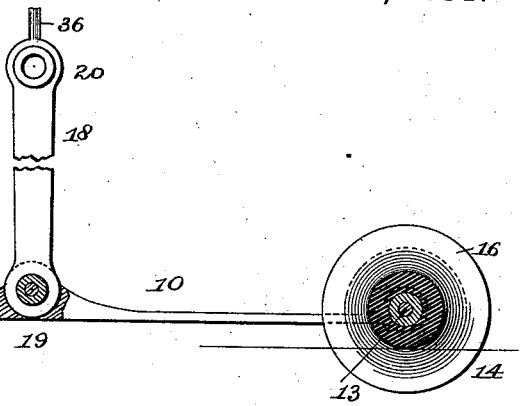
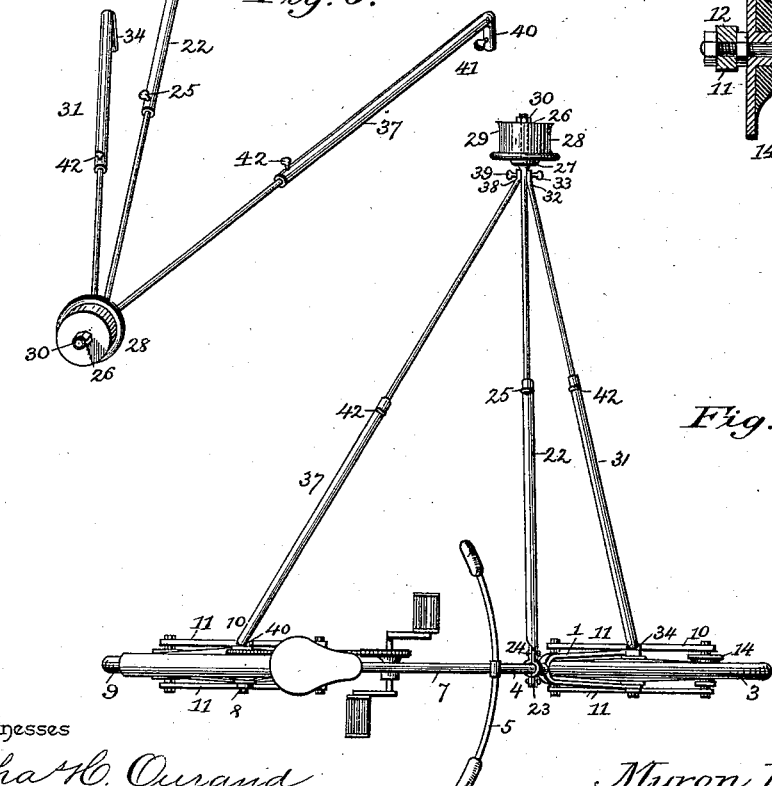
Witnesses
Chas. H. Durand
N. T. Collamer
Inventor
Myron B. Gibson
By his Attorneys,
C. A. Snow & Co.
THE NORRIS PETERS CO., PHOTO-LITHO., WASHINGTON, D. C.

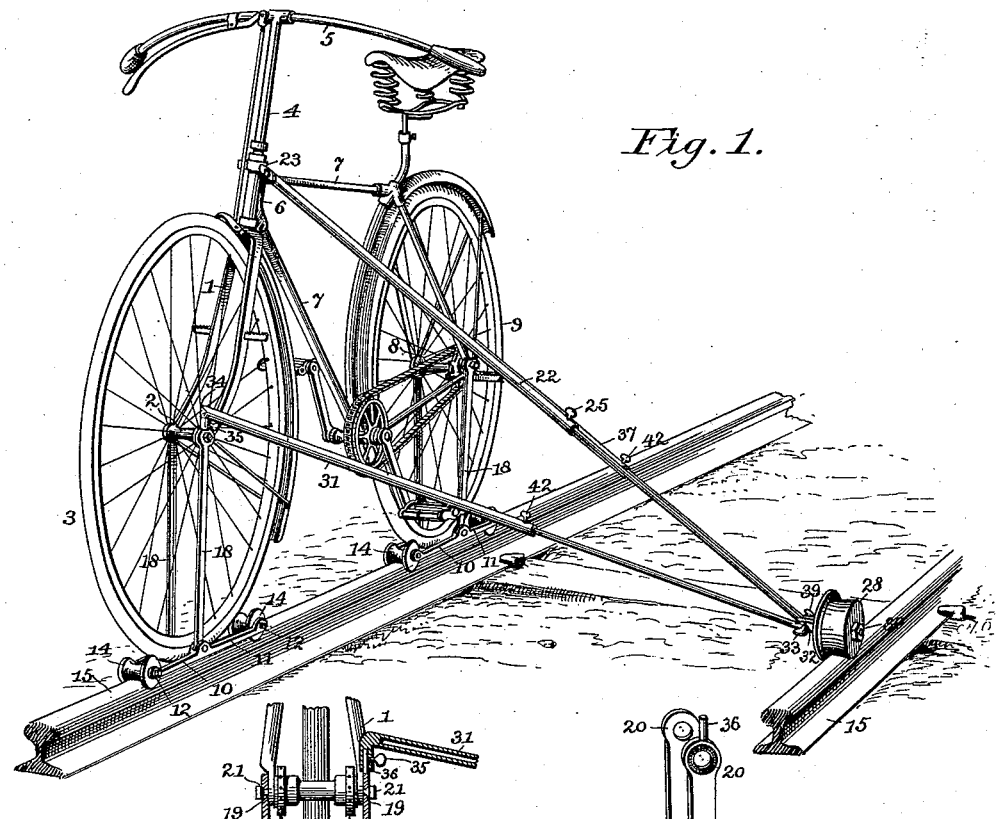
(No Model.) 2 Sheets—Sheet 1.
M. B. GIBSON.
BICYCLE.
No. 464,357. Patented Dec. 1, 1891.

UNITED STATES PATENT OFFICE.

MYRON B. GIBSON, OF UKIAH, CALIFORNIA.

BICYCLE.

SPECIFICATION forming part of Letters Patent No. 464,357, dated December 1, 1891.

Application filed August 5, 1891. Serial No. 401,724. (No model.)

*To all whom it may concern:*

Be it known that I, MYRON B. GIBSON, a citizen of the United States, residing at Ukiah, in the county of Mendocino and State of California, have invented a new and useful Bicycle, of which the following is a specification.

This invention relates to attachments for Safety bicycles, and the objects in view are to provide a simple, cheap, and readily-transportable attachment to be applied with facility to and removed from that class of bicycles known as "Safeties," and to thereby adapt the same for travel upon railroad-tracks.

With the above main objects in view the invention consists in certain novel features of construction and combinations of parts, as will be hereinafter specified, and particularly pointed out in the claims.

Referring to the drawings, Figure 1 is a perspective of a bicycle of the Safety type mounted upon a railroad-track and provided with an attachment constructed in accordance with my invention. Fig. 2 is a transverse section through the front wheel. Fig. 3 is a detail in perspective of one of the flexible guide-trucks. Fig. 4 is a transverse section through said truck and one of the guide-wheels. Fig. 5 is a longitudinal section of the truck. Fig. 6 is a detail in perspective of the attachment. Fig. 7 is a plan of the bicycle and its attachment.

Like numerals of reference indicate like parts in all the figures of the drawings.

1 designates the front fork of an ordinary Safety bicycle, between which, upon the axle 2, is journaled the front steering-wheel 3, the same being held in position by the usual nut. From the fork rises the steering-bar 4, carrying the handles 5, and loosely connected with the steering-bar below the handles is the head 6 of the backbone or reach 7 of the machine. The reach at its rear end, as usual, is bifurcated and receives the axle 8, upon which is journaled the rear drive-wheel 9. The usual gear for operating the drive-wheel is also provided and may be of any desired pattern.

Guide-trucks 10 are provided for both the front and rear wheels, and each truck comprises opposite longitudinal side bars 11, the ends of which terminate in bearings 12, which receive transverse axles 13—one located in front and one behind each of the wheels of the bicycle. Upon these axles grooved guide-wheels 14, covered with rubber, wood, or other sound-deadening material, are mounted; the grooves of the wheels adapting them to somewhat loosely embrace and ride upon the rails 15. The longitudinal side bars of the trucks are preferably formed of spring metal, for a purpose hereinafter apparent, and the outer flanges 16 of the grooved wheels 14 are preferably but half the size of the inner flanges 17, the purpose of which will likewise be hereinafter explained. From each of the side bars 11 rises a central vertical standard 18, the lower end of which terminates in an eye and is pivoted, as at 19, to said side bar, and the upper end of which terminates in an eye 20 for taking over the axles of the wheels of the bicycle. These eyes are concaved or conical, as shown, so that they readily receive the conical nuts 21 of the ordinary bicycle, and hence do not require the lengthening of the axles of the wheels for the purpose of accommodating the arms.

It will be seen that the grooved rollers 14, fitting as they do the treads of the rails, retain the rubber-tired bicycle-wheels directly upon the treads of the rails and prevent any lateral movement as would be calculated or likely to throw the rubber-tired wheels from the rails. By reason of the flexibility of the side bars of the trucks said side bars from their points of pivot to their outer ends are capable of vibrating or yieldingly riding over rail-joints, &c.

The crossings of railroads, as is well known, are usually planked upon the outsides of the rails, and hence it is for this reason that I prefer to make the inner flanges 16 of the grooved rollers 14 of a greater diameter than the outer flanges, so that the smaller flanges may not come in contact with such planking to an extent to render any shock to the machine, but will readily ride up and over the same and yet leave the inner flange 16 of each wheel in engagement with the rail.

22 represents an inclined brace terminating at its upper end in a clasp or collar 23, removably connected by bolts 24 to the steering-bar of the machine. The brace is telescopic and may be adjusted by means of a set-bolt 25. The lower end of the brace is bent to form the bearing 26, and near the same is provided with a collar 27. A wheel 28, having an L-shaped periphery and slightly beveled, as at 29, upon its outer side, is journaled upon the bearing 26, and is retained in position by a nut 30.

31 designates a transverse brace bent at its outer end and perforated to form an eye 32, which receives and is connected by a set-screw 33 to the inclined brace 25, immediately in rear of its collar 27. The inner end of the transverse brace is provided with a right-angularly bent and bored end 34, having a set-screw 35, the bore of said end receiving a stud 36, formed on the upper end of the inner front vertical standards 18, said brace being thus removably connected in position upon the standard.

37 designates a rear transverse diagonal brace, which terminates at its outer end in a bent eye 38, which receives the brace 25 immediately in rear of the collar 27 and is connected thereto by a set-screw 39. The inner end of the brace has a downwardly bent and bored end 40, which receives a stud 41 upon the upper end of the inner vertical standard 18, and is connected thereto by a set-bolt 41, passed through the bent end of the brace. Both of the transverse braces, like the inclined brace, are telescopic, preferably, and are adjustable by means of set-bolts 42. It will be seen that all of the braces may be adjusted longitudinally, so as to bring the wheel 28 upon the rail. When not in use, the collapsing of the braces renders the attachment more easily transported or packed, as will be obvious.

In operation the bicycle is driven in the usual manner and is held in place upon a rail by the described attachment. The machine as a whole is not increased in weight to any great extent, and rapid riding as well as safe riding is attained.

Having described my invention, what I claim is—

1. The combination, with the guide and drive wheels of a Safety bicycle and their axles, of front and rear trucks located below the axles and each consisting of opposite side bars, front and rear axles, grooved rollers and standards rising from the side bars and provided with conically-bored eyes for receiving the axles of the wheels, the conical nuts mounted on the axles and taking in the eyes, and a side brace extending from the framework of the machine and provided with a roller, substantially as specified.

2. The combination, with the front and rear axles and wheels of a Safety bicycle, of front and rear trucks, each consisting of a pair of standards depending from the axles, a pair of opposite longitudinal flexible side bars connected with the lower ends of the standards, axles mounted in the ends of the side bars, and grooved rollers mounted on the axles, substantially as specified.

3. The combination, with the front and rear wheels of a Safety bicycle, of front and rear trucks for said wheels, each truck consisting of opposite side bars, standards connecting the axles of the wheels with the side bars, axles connecting the ends of the side bars, and grooved rollers mounted on the axles of the trucks and having their outer flanges of less diameter than their inner flanges, substantially as specified.

4. The combination, with the front and rear axles of a Safety bicycle, the oblong trucks having grooved rollers, standards rising therefrom and provided with eyes for receiving the axles and above the same with studs, of a three-branched brace, the two lower branches having bores for the reception of the studs and set-screws for securing the same and the upper branch having a collar for the reception of the steering-bar, the outer ends of said branches being connected and terminating in a bearing, and a roller mounted on the bearing, substantially as specified.

5. The combination, with the front and rear axles of a Safety bicycle, the opposite pairs of flexible side bars located at opposite sides of the wheels, the axles mounted in the ends of the side bars and carrying grooved rollers, the standards pivoted at their lower ends to the side bars and provided at their upper ends with eyes for engaging the axles of the wheels of the bicycle, the inner standards being provided with studs, of the inclined brace terminating at its upper end in a collar for embracing the steering-bar and at its lower end in a bearing, and the opposite transverse braces connected with the inclined brace, diverged and bent at their inner ends to form bored heads for receiving the studs of the standards and provided with set-screws, said inclined and transverse braces being formed telescopically, substantially as specified.

In testimony that I claim the foregoing as my own I have hereto affixed my signature in presence of two witnesses.

MYRON B. GIBSON.

Witnesses:
GEO. W. STOUT,
Q. A. OVERMYER.